March 22, 1955 R. S. MAUTNER ET AL 2,704,781
STORAGE BATTERIES
Filed Nov. 2, 1953

INVENTORS
ROBERT S. MAUTNER
& SEYMOUR ROSENBERG
BY
ATTORNEY

United States Patent Office 2,704,781
Patented Mar. 22, 1955

2,704,781

STORAGE BATTERIES

Robert S. Mautner, Massapequa, and Seymour Rosenberg, Bronx, N. Y., assignors to Electrocell Corporation, a corporation of New York Application November 2, 1953, Serial No. 389,754

7 Claims. (Cl. 136—170)

This invention relates to electric storage batteries and more specifically to a container for a number of alkaline cells of the silver-zinc type permitting relatively tight closure of the cells while at the same time allowing escape of gases and attendant release of undesired pressures.

One of the objects of this invention is to dispose in a battery container a number of separate compartments each sealed off with respect to the other and all closed from the outer atmosphere through a number of separate diaphragms which while permitting excess gases to escape from these compartments in one direction, prevent entry of atmospheric components into these compartments from another direction.

Another object of this invention is to provide a common closure member for a number of compartments constituting the battery container and to close each of these compartments tightly with respect to each other and also with respect to the outer atmosphere.

Still another object of this invention is to equip the closure member for an electric battery with one or more apertures permitting escape of excess gases or release of undesired pressure and to arrange around these openings inner projections, extending inside the battery, of sufficient height to prevent spilling of the electrolyte in an inverted position of the battery container.

A more specific object of the invention is to equip the closure member for a multicompartment battery container with a number of specially shaped apertures permitting escape of excess gas in one direction only and preventing spilling of the electrolyte in any position of the container.

A further specific object of the invention is to provide diaphragms having a preferred direction of permeability preventing entry of atmospheric impurities in one direction and permitting egress of excess gases in the other direction.

In another embodiment of the invention the closure mechanism of a multicompartment battery container consists of two plates, an inner plate closing the different compartments with respect to each other, having openings and grooves permitting the terminals from the different compartments to pass and to be interconnected, and an outer plate covering the inner plate and sealing the compartments against the atmosphere while protecting the different intercompartmental connections.

These and other objects of the invention will be more fully understood from the drawings enclosed herewith in which.

Figure 1:
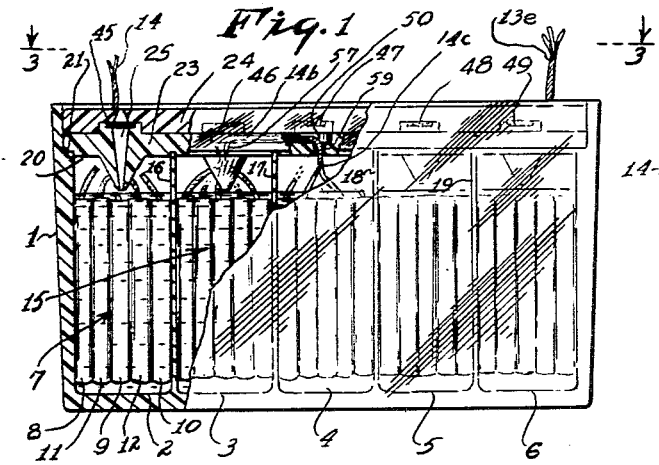
Figs. 1, 2 and 3 represent an assembly battery embodying certain principles of the invention in front, side and top elevations respectively, partly in section.
Figure 2:
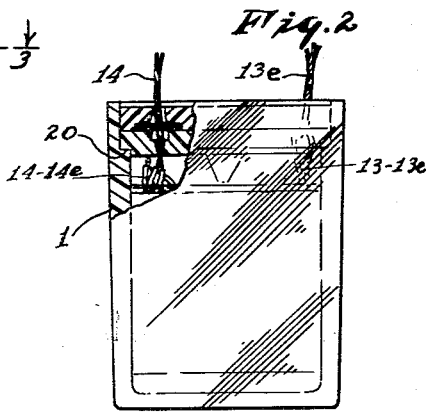
Figure 3:
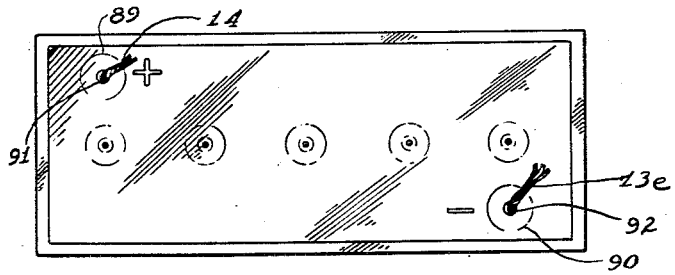
Figure 4:
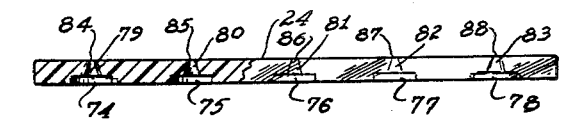
Fig. 4 represents a front view of a closing member for the battery container in section.

In Figs. 1, 2 and 3 the battery container is of rectangular shape and made for example of alkali-resisting plastics as indicated at 1 and provided with five separate compartments 2, 3, 4, 5 and 6 respectively, each adapted to receive an electrode plate assembly schematically indicated at 7 and consisting of three negative electrodes 8, 9 and 10 respectively interleaved with two positive electrodes 11, 12 respectively as for example indicated in our copending application, titled: "Improvements in or Relating to Alkaline Silver-Zinc Battery Cells," concurrently filed herewith.

The electrode wires for the different cells are twisted around each other and series connected. The positive wires from compartment 2 and the negative wires from compartment 6 form the terminals for the battery as shown at 13, 14 respectively.

A similar plate assembly for compartment 3 is schematically indicated at 15.

Compartments 2, 3, 4, 5 and 6 are separated by walls 16, 17, 18, 19 respectively which reach only slightly beyond line 20 to a predetermined height in container 1. Line 21 represents an inside projection, Fig. 1, extending for about an eighth of an inch towards the inside of container 1, and along its wall.

The closure mechanism for battery container 1 consists of two quadrangular plates 23, 24.

Figure 5:
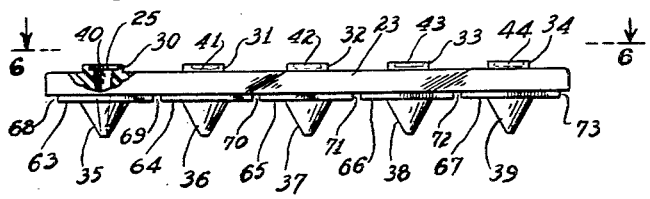
Figs. 5 and 6 represent top and front views of another closure member shown in Figs. 1, 2 and 3.
Figure 6:
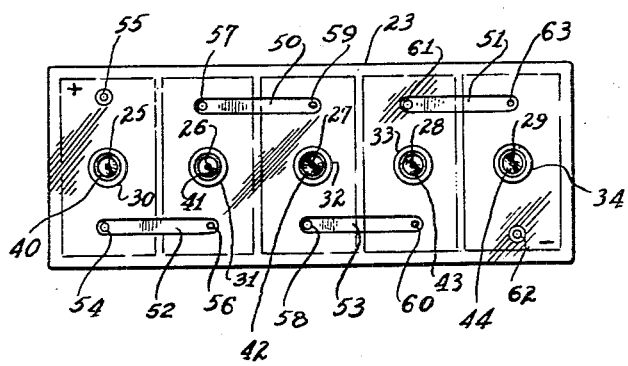

Inner plate 23 as indicated in greater detail in Figs. 5 and 6 is provided with a number of openings 25, 26, 27, 28 and 29 (Fig. 6) extending into compartments 2 through 6 respectively.

Each of openings 25 through 29 is provided with cylindrical projections 20 through 34 on one, or the other, side of plate 23 and somewhat higher conical projections 35 through 39 on the outer, or inner, side of plate 23.

In addition, outer projections 30 through 34, on the outer side of plate 23, are provided with cylindrical recesses 40 through 44 surrounding openings 25 through 29 and adapted to receive each a gum rubber diaphragm or disc of predetermined thickness and permeability as schematically indicated at 45 through 49 respectively.

In the experiments underlying the invention it has been found that gum rubber diaphragms of predetermined thickness have the characteristic that they are relatively permeable to gases such as hydrogen developed in a battery of the silver-zinc type and relatively impermeable to harmful gases such as carbon dioxide derived from the outer atmosphere.

Inner cones 35 through 39 are of such height or downward extension so as to prevent the electrolyte from spilling over through holes 25 through 29 if battery container 1 is turned upside down; in other words the height of cones 35 through 39 depends upon the amount of free electrolyte present in the filled battery 1.

There are also provided on the upper or top surface of inner plate 23 a number of recesses or grooves of longitudinal extension arranged substantially parallel along the long side or edges of inner plate 23 as schematically indicated in Fig. 5 at 50 through 53 respectively. Each of recesses 44 through 47 has openings extending through inner plate 23 in a position facing the different electrode wires connected to plate units of the type such as indicated at 7 and 15 respectively for compartments 2 and 3 and arranged in all compartments 2 through 6 respectively.

The negative wires from compartment 2, 13 are passed through hole 54 in plate 23 and connected with the positive wires, 14B which are passed through hole 56 in plate 23. Similarly, the negative wires 13B are passed through hole 57 in plate 23 and connected with positive wires passed through hole 59 in plate 23. Similarly, the remaining wires are connected from adjoining compartments until all the cells are connected in series. Positive wires 14 from compartment 2 are passed through hole 55 in plate 23 and will act as the positive terminal for the battery. The negative wires 13E from compartment 6 are passed through hole 62 in plate 23 and act as the negative terminal for the battery. Wires which have been connected in series are laid respectively into slots 50, 51, 52 and 53. The slots are then filled with a thermosetting cement which acts to seal holes 57, 59, 61, 63, 54, 56, 58 and 60. Similarly, the cement is applied to seal hole 55 and hole 62. The cement is of a type which exhibits good adherence to both metals and plastic, cures at a temperature under 180° F. and is entirely resistant to alkaline electrolyte.

The bottom side of inner plate 23 in addition to having conical projections 35 through 39, central openings 25 through 29 and terminal openings 55 through 61, also has relatively low projections schematically indicated at 63 through 67, respectively, fitting exactly over the cross section of compartments 2 through 6 respectively; the interspaces 68 through 72 between and adjacent projections 63 through 67 form contact surfaces with corresponding upper edge surfaces of walls 16 through 19 and projection 21, sealing compartments 2 through 6 respectively.

By applying to interspaces 68 through 73 a thermoplastic cement at bottom side of inner plate 23, plate 23 can be securely attached to container 1.

Container 1 is closed with plate 23 after the various plate units have been inserted in compartments 2 through 6 with terminal wires 13 through 13e and 14 through 14e extending through inner plate 23. Thereafter terminal wires 13 through 13e and 14 through 14e are bent over to contact each other in longitudinal recesses 50 through 53 as indicated above.

In the next operation, permeable diaphragms 45 through 49 are placed in corresponding recesses 40 through 44, and outer or upper closure plate 24 is disposed over lower or inner plate 23 as schematically indicated in Fig. 1.

Outer plate 24 shown in enlarged scale in Figs. 6 and 7 also consist of alkali resistant plastic and is provided at its bottom side with cylindrical recesses arranged in the center of plate 24 as schematically indicated at 74 through 78 respectively.

In the center of cylindrical recesses 74 through 78 there are conical recesses schematically indicated at 79 through 83, respectively, forming at their tops, openings 84 through 88 aligned and communicating with openings 25 through 29 of inner plate 23 and serving to permit passage of excess pressure or gas from the inside of battery 1 through diaphragms 79 through 83 to its outside.

Two further recesses also of cylindrical form but arranged more laterally as schematically indicated at 89 and 90 are disposed surrounding openings 91 and 92 which are aligned with openings 55, 62 of inner plate 23 for the passage of main terminal wires 14 and 13e respectively.

The invention is of course not limited to shape, form, type and material of the container, nor to the number and arrangement of compartments, plates and plate units shown and described but may be applied to any form and type of battery and battery cell, battery plate and circuit connections without departing from the scope of this disclosure. Also, this invention is not limited to silver-zinc batteries but can apply to other types of rechargeable battery systems.

We claim:

1. In an electric battery, a container having a number of compartments in juxtaposition and at least one cover member extending over said compartments so as to close said compartments with respect to each other and all said compartments with respect to the outside, said cover member having openings facing each of said compartments and projections around said openings and extending from the upper surface of said cover member; said projections have recesses adapted to receive a diaphragm.

2. Battery according to claim 1, wherein said diaphragm is relatively permeable to relatively light gas coming from the inside of the battery and relatively impermeable to relatively heavy gas coming from the atmosphere and harmful to the battery system.

3. Battery according to claim 1, wherein said diaphragm is relatively permeable to relatively light gas coming from the inside of the battery and relatively impermeable to relatively heavy gas coming from the atmosphere; said diaphragm consisting of a gum rubber disc.

4. In an electric battery, a container having a number of compartments in juxtaposition and at least one cover member extending over said compartments so as to close said compartments with respect to each other and all said compartments with respect to the outside; said cover member having longitudinal recesses on the outside thereof extending parallel to its longitudinal extension and adapted to receive series connected electrode wires derived from adjacent compartments; there being provided openings in said cover member permitting passage of the electrode wires.

5. In an electric battery, a container having a number of compartments in the juxtaposition and two cover members extending over said compartments so as to close said compartments with respect to each other and all said compartments with respect to the outside, said two cover members being of substantially rectangular shape; the battery container being also of rectangular shape; one of said cover members being arranged above the other and the lower one being arranged to extend over said compartments and being provided with openings and means to permit escape of inner gas and prevent access of outer gas; the second cover member being arranged on top of the first cover member and also provided with openings aligning with said inner openings.

6. In an electric battery, a container having a number of compartments in juxtaposition and two cover plates extending over said compartments so as to close said compartments with respect to each other and all said compartments with respect to the outside; said two cover plates being arranged above each other, the inner plate extending over said compartments and provided with openings permitting escape of gases and inside projections around these openings to prevent spilling of the electrolyte in an upside down position of the battery, and outside projections around said openings adapted to receive diaphragms to prevent access of heavy gas from the outside and permit escape of light gas from the inside of the battery; the second cover plate having inside recesses aligned with the outside projections of the inner cover plate so as to permit the two plates to be in surface contact with each other, and means for gluing the two plates to each other along said contact surface.

7. Battery according to claim 6 wherein the upper surface of the inner plate also has longitudinal recesses to receive electrode wires of adjacent compartments in electrical contact with each other and arranged in a direction substantially parallel to the surface of said cover plates and in a position substantially beneath the upper surface of said inner plate.

References Cited in the file of this patent

UNITED STATES PATENTS

| 2,364,896 | Gray | Dec. 12, 1944 |

FOREIGN PATENTS

| 267,663 | Germany | Nov. 26, 1913 |
| 5,097 | Great Britain | of 1908 |
| 563,418 | Great Britain | Aug. 14, 1944 |